Nov. 12, 1968    W. F. TAYLOR    3,410,661

LIQUID PHASE REFORMING PROCESS

Filed March 2, 1967

W. F. TAYLOR  INVENTOR

BY Henry Berk

PATENT ATTORNEY

United States Patent Office 3,410,661
Patented Nov. 12, 1968

3,410,661
LIQUID PHASE REFORMING PROCESS
William F. Taylor, Scotch Plains, N.J., assignor to Esso Research and Engineering Company, a corporation of Delaware
Continuation-in-part of application Ser. No. 385,931, July 29, 1964. This application Mar. 2, 1967, Ser. No. 620,044
4 Claims. (Cl. 23—213)

ABSTRACT OF THE DISCLOSURE

A hydrogen gas product is produced by reaction of liquid hydrocarbons with water in the presence of a nickel reforming catalyst at low reaction temperatures, e.g., 110° to 500° F., and at atmospheric pressure and above.

CROSS REFERENCES

This application is a continuation-in-part of Ser. No. 385,931, filed July 29, 1964, now abandoned, by William F. Taylor on producing gas rich in hydrogen from hydrocarbons contacted with water in liquid phase with a catalyst as herein described and claimed rather than from hydrocarbons in vapor phase at low pressures and low temperatures.

The liquid phase reforming of hydrocarbons with water in the presence of a solid catalyst for producing a gas product rich in hydrogen is a distinctly novel achievement. In contrast to vapor phase reforming, the liquid phase reforming conserves large quantities of heat needed for vaporization in vapor phase reforming and thus improves the thermal efficiency of the process.

BACKGROUND

The reaction of gaseous hydrocarbons, e.g., methane to butane or vaporized normally liquid hydrocarbons, e.g., naphtha, with steam at above 500° C. (932° F.) in the presence of a catalyst to form hydrogen, methane and carbon oxides as principal product is well known as a steam-reforming process.

In steam-reforming of gaseous or vaporized hydrocarbons, high reaction temperatures favor hydrogen production relative to methane, and catalysts with sufficient activity to insure high conversion rates are known to have been used to make such a reaction go to completion at temperatures above 1000° F.

It is also known that a gas rich in hydrogen can be produced at lower temperatures in the range of 550° to 950° F. by reaction of vaporized hydrocarbons with steam at elevated pressures of 150 to 1500 p.s.i.a. when the conversion level is below 40%, i.e., with shortened time of contact in the presence of highly active catalysts to prevent increased formation of methane, such as results from the methanation reaction of hydrogen with carbon monoxide as reaction is extended to approach equilibrium.

SUMMARY OF THE INVENTION

The liquid phase reforming process consists in contacting a nickel catalyst of high reforming activity with a liquid feed mixture of hydrocarbon oil and water at low temperatures, preferably in the range of 110° to 500° F. and by obtaining a separation of hydrogen-rich product as it is formed, thus achieving essentially a differential reaction, i.e., a reaction operating at low hydrocarbon conversion in which the production of hydrogen is enhanced relative to methane. A gas collection zone free of catalyst is maintained contiguous to a bed of the catalyst flooded by the liquid reaction mixture to obtain a rapid separation of the gas from the catalyst. The liquid reaction mixture feed is preferably in the form of an oil-in-water emulsion.

Up until now there has been no teaching in the prior art on reforming of aqueous emulsions of hydrocarbons to produce hydrogen or gas products rich in hydrogen.

In the previously known vapor phase reforming processes, the water and hydrocarbon feeds have to be vaporized and heated to an elevated temperature for supplying the endothermic heat of reaction. The increased contact of the gas products with the catalyst increases the conversion of hydrocarbon and favors the formation of methane. The heat required for vaporizing and superheating the vapors is of a high magnitude and costly. A subsequent processing of the gas products for separation of components requires extensive cooling and more operations.

The production of hydrogen by reforming hydrocarbons at ultra low temperatures with nearly negligible formation of CO and $CH_4$ was not possible without a catalyst of high activity and without a method for minimizing contact of the gas products with the catalyst under the low temperature conditions which theoretically favor formation of mehane raher than hydrogen.

Advantageously, by the use of low temperatures and sufficient pressure to maintain the hydrocarbon and water principally in the liquid phase, the partial or differential conversion permits the use of highly active reforming catalyst which almost at the instant of contact with the feed forms principally hydrogen and very little normally gaseous hydrocarbons, e.g., methane, ethane, propane, and butane. Also, in using low reaction temperatures, the catalyst life is prolonged because there is less danger of oxidation, sintering, or coking.

Highly active catalysts useful for the low temperature partial conversion of the hydrocarbons to obtain principally hydrogen are typified by mixed nickel-alumina and nickel-silica catalysts which have nickel contents from 10 to 75 wt. percent, preferably 40 to 45 wt. percent and these mixed catalysts may be promoted by certain metals, e.g., barium, strontium, cesium, cerium, lanthanum, yttrium, iron, potassium, and copper, present as oxides, carbonates, or both oxides and carbonates. The proportion of promoter may be between 0.5 to 12 wt. percent of the catalyst.

Since highly active catalysts per se and methods for making them are regarded as known in the prior art, details on all such catalysts are not set forth, but general characterizations and representative examples are given.

In general, the highly active nickel catalysts have high nickel surface areas, i.e., 20 to 30 $m.^2/g$. They are obtained by coprecipitations of nickel with aluminum as hydroxides, carbonates, or basic carbonates from aqueous solutions of nitrate salts by use of $NH_4HCO_3$ at low temperature (200° to 400° F.), drying of the precipitates, and low temperature (400° to 900° F.) calcining of the dried precipitates in air and low temperature (600° to 900° F.) activation of the calcined precipitates by hydrogen. The promoters are admixed as decomposable compounds, e.g., hydroxides, carbonates or nitrates with the precipitates. Similarly mixed catalysts of nickel with silica may be prepared using a metasilicate and kieselguhr, in place of aluminum compounds to have the nickel interspersed with $SiO_2$ instead of $Al_2O_3$. The catalyst granules may be 1 to 5 mm. particles or be compressed into pellets or be extruded.

As specific examples of catalysts which may be used in the practice of this invention, there can be mentioned: ceria promoted nickel-alumina catalysts, lanthanum promoted nickel-alumina catalysts and cerium-lanthanum promoted nickel-alumina catalysts made in accordance with the procedure set forth in copending commonly assigned application S.N. 317,777; catalytic metals of Group VIII deposited as hydrosilicates on a porous solid support as set forth in commonly assigned copending application S.N. 317,828; now U.S. Patent No. 3,351,566; potassium, cesium, barium and strontium promoted Ni-Al$_2$O$_3$ made in accordance with the procedure set forth in the copending commonly assigned application S.N. 317,799; now U.S. Patent No. 3,320,182; Ni-Al$_2$O$_3$-Fe made in accordance with the procedure set forth in copending commonly assigned application S.N. 317,800; and Ni-ZnCrO$_4$-Al$_2$O$_3$-Ba made in accordance with the procedure set forth in copending commonly assigned application S.N. 365,803, and promoted nickel-alumina catalysts made in accordance with the procedure set forth in copending commonly assigned application S.N. 365,566. Higher nickel content promoted mixed Ni-Al$_2$O$_3$ catalysts are also highly active for the low temperature partial conversion of hydrocarbons to hydrogen. These catalysts have nickel to aluminum atom ratios usually in the range of 1.5/1 to 4/1 and can be promoted by elements from the group consisting of La, Ba, Sr, Ce, Cs, K, Fe, Y and Cu.

Hydrocarbons which can be used as a feed in producing hydrogen include the paraffinic hydrocarbons, saturated, unsaturated and cyclic, preferably straight chain saturated hydrocarbons having from 5 to 20 carbon atoms depending on the mode of operation. Examples of hydrocarbons which can be present in the feed include pentane, hexane, heptane, octane, decane, dodecane, heptene, and pentene. The hydrocarbons to be used as feed mixed with water in an oil/water emulsion are mainly those of higher boiling points, e.g., above 200° F. The hydrocarbon oil feed may include some partially oxygenated hydrocarbons, e.g., alcohols, aldehydes, ketones, esters and ethers, preferably such compounds that have partial miscibility with the water. Generally, the ratio of water to hydrocarbon is in the range of from about 0.5 to 1, to 6 to 1 gram moles of water per gram atom of carbon, but higher proportions of water aid in forming more stable emulsions.

From analyses of products, proportions of reactants, and other considerations, the partial conversion yielding high amounts of hydrogen may be regarded as involving the following overall principal reaction paths, assuming that n-hexane is typical of the average hydrocarbon reactant:

(1) $C_6H_{14} + 6H_2O \rightarrow 13H_2 + 6CO$
(2) $CO + H_2O \rightleftharpoons CO_2 + H_2$
(3) $CO + 3H_2 \rightleftharpoons CH_4 + H_2O$ Reaction (1) implies that the hydrocarbon initially decomposes in the presence of H$_2$O to liberate hydrogen and form an oxide of carbon, presumably carbon monoxide. Following this, the carbon monoxide reacts rapidly with water to form carbon dioxide and more hydrogen in the Water Gas Shift reaction (2). The carbon monoxide may also react with hydrogen to form methane and water in the methanation reaction (3). The thermodynamic equilibrium for reactions (2) and (3) are known to control the product composition at complete hydrocarbon feed conversion. However, reaction (2) is very rapid relative to reaction (1) since the product contains very little carbon monoxide at low conversion levels. Reaction (3) is slow relative to reactions (1) and (2). This forms the theoretical basis for this invention since it allows a hydrogen-rich product to be formed at process conditions, where in terms of equilibrium alone, a hydrogen-poor product would be expected, i.e., at low temperature. This invention, moreover, is based on the unexpected result that a hydrogen-rich product is obtained in a differential reaction system (e.g., low conversion levels per pass) at low temperatures and is not contingent on the validity of the reaction paths proposed. Reaction (1) is endothermic and reaction (2) slightly exothermic. Reaction (3) is strongly exothermic and tends to increase the temperature in the reaction zone.

In the process of producing hydrogen by liquid phase reforming, a number of procedures can be employed. The hydrocarbon and water feed can be passed over the catalysts at a partial conversion level and the effluent passed into a gas-liquid separator operating at low temperature where unconverted liquid hydrocarbon and water is separated from the product gas. Inasmuch as low conversion is an essential feature of this invention, the liquid reaction mixture, that is, the unconverted hydrocarbon and the water in liquid phase can be fed sequentially into a number of catalyst zones with intermediate product separation or it can be recycled back to one or more of the zones. By combining the removal of hydrogen and CO$_2$ from the reaction zones and feeding the unconverted hydrocarbon into a number of different reaction zones or by recycle of the unconverted hydrocarbon and water, fast conversion of the entering hydrocarbon feed can be obtained with very low conversion to methane.

Alternatively, the hydrogen can be removed selectively from the reaction zones, that is, the catalyst zones or beds, by using diffusion membranes. Suitable diffusion membranes include palladium, palladium-silver and porous tetrafluoroethylene membranes depending on the temperature used. The porous tetrafluoroethylene membranes are made by intimately mixing finely divided tetrafluoroethylene with either ammonium oxalate or ammonium carbonate, pressing the mixture into the desired shape and then gradually heating the pressed structure from ambient up to about 190° F. in order to decompose the ammonium compound thereby providing a porous element consisting essentially of tetrafluoroethylene. The catalyst bed or layer itself can be contained inside a diffusional membrane, or diffusional membranes can be located in an alternating series after a differential catalyst section. A differential catalyst section provides low conversion levels per pass.

When feeding the hydrocarbon and water as a liquid emulsion, the reaction system should be such that the hydrogen-rich gas is allowed to separate from the catalyst bed as quickly as possible after it is formed. This is accomplished by means of a gas separation zone contiguous to the catalyst bed which is maintained free of catalyst.

The liquid emulsion can be fed to a catalyst bed with a catalyst free vapor space above the bed such that the product gas rises through the catalyst bed as it is formed and escapes into the vapor space before any appreciable secondary reaction to methane can occur. Such a system can consist of a tube or duct partially filled with the catalyst and with the liquid being fed horizontally to the catalyst bed in a flow system, or the liquid feed can be fed batchwise to such a system with sufficient contact time allowed between feed additions to insure the conversion of the hydrocarbon.

Another way the liquid feed system can be used is by means of a series of enclosed differential catalyst beds in which continuous separation of the product gas and liquid feed is not achieved but where gas separation zones spaced between the differential reactors allows the product to escape from the catalyst bed before excessive conversion of the hydrogen to methane occurs. Also, the product hydrogen can be separated from the unconverted feed and other product gases by use of diffusion membranes such as palladium, palladium-silver and porous tetrafluoroethylene membranes.

When the reacting mixture is a liquid emulsion, the temperature of the reaction is preferably maintained between about 110° and 500° F. Higher than atmospheric pressure can be used in the emulsion system without excessive secondary reaction of the product hydrogen to methane. For example, the secondary reaction is minimized by use of shallow catalyst beds which allow the product gas to escape quickly or by use of a larger number of differential reactors or reaction zones in series with intervening gas product separation zones. In this manner, high pressure hydrogen can be generated at high thermal efficiency since the feed is not vaporized to a substantial extent and there is no need for gas compressors to supply the high pressure with their high operating energy requirements. Higher pressures with the liquid feed system will also allow a higher operating temperature with a lower catalyst requirement than would a low-temperature, low-pressure operation, since the operating temperature is dictated to a great extent by the amount of feed hydrocarbon and water which must be held in the liquid phase, which is a function of their partial pressures at a given temperature.

DESCRIPTION OF THE DRAWING

Referring now to FIG. 1, there is shown a conduit 1 for the admission of the liquid hydrocarbon oil feed to the system, conduit 2 for admission of liquid water feed, conduit 3, wherein the hydrocarbon and water feeds are mixed to form an emulsion which is passed into heat exchanger 4 where the emulsion is warmed. The warmed emulsion may be passed through a heater 5, which supplies heat for the desired reaction temperature, then into the reactor 6.

Figure 1:
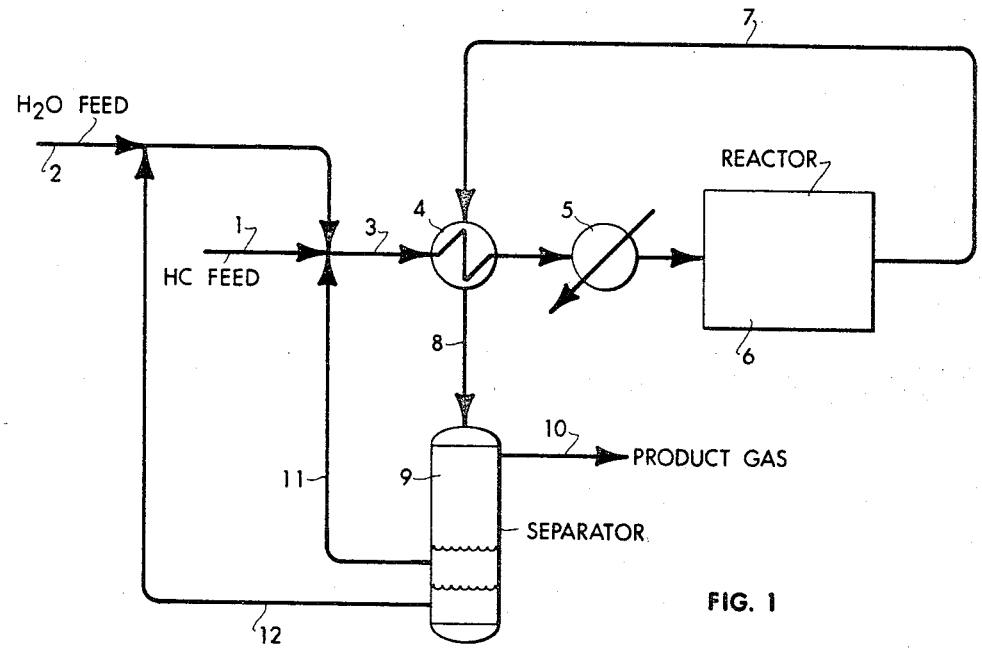
FIG. 1 is a flow diagram of an apparatus useful for the production of hydrogen from a normally liquid hydrocarbon and water mixture.

Reactor 6 contains one or more catalyst beds, i.e., beds of active nickel-containing catalyst particles, or surfaces coated with catalyst for the reforming reaction.

The product gases from the reforming reaction are removed from reactor 6 by means of conduit 7 and are passed through heat exchanger 4 where the product gases and unconverted hydrocarbon and water are cooled by indirect heat exchange with the liquid emulsion feed. The product gases and condensate are removed from heat exchanger 4 at a lowered temperature and are passed to gas-liquid separator 9 by conduit 8.

The gas-liquid separator 9 permits removal of the product gases which comprise primarily $H_2$, carbon dioxide, and some methane or hydrocarbon gas by way of conduit 10. The unreacted liquid hydrocarbon condensate forms an upper liquid phase which is withdrawn through conduit 11 from separator 9 for recycling to conduit 1. The lower phase of liquid water collected in separator 9 is withdrawn through conduit 12 and recycled to water-feed conduit 2.

The product gases removed from the separator 9 by conduit 10 may then be separated into component parts by liquefaction and fractionation or they may be used as they are removed from the separator. The gases rich in hydrogen may be used effectively as a fuel for a fuel cell. Gaseous hydrocarbon components separated from the $H_2$ product may be used as a heating fuel, e.g., to undergo combustion for heating the feedstock going into the reactor 6.

Various known solvent absorption or adsorption processes may be used to remove carbon dioxide and gaseous hydrocarbons from the hydrogen.

In the basic process carried out as shown in the flow diagram of FIG. 1, the principal features of the process are mixing of liquid hydrocarbon oil feed with water feed to form an aqueous emulsion under pressure, heating of the emulsion under pressure to the desired reaction temperature while maintaining the hydrocarbon and water principally in the liquid phase upon contact of the emulsion with the solid catalyst in the reactor in a manner which permits the gas to be removed as it is formed with a partial conversion of the hydrocarbon, and passing the unreacted liquid hydrocarbon and water together with the gas product through a cooler 4 to a separator 9 where the gas product is separated from unreacted liquids. Using the catalyst in a plurality of beds in reactor 6 each of the beds may be in a separate tube surrounded by a heating medium so that heat is imparted by indirect heat exchange from the heating medium to the emulsion flowing through the catalyst beds and the gas formed in each of the beds is made to flow with unreacted emulsion out of the tubes in reactor 6 through conduit 7 to the heat exchanger 4 for cooling, then to the separator 9.

By feeding 16.5 moles of liquid heptane and 159 moles of liquid water into conduits 1 and 2 shown in FIG. 1, it is possible to obtain a hydrogen-rich gas product with 0.1 to 15% conversion of the liquid heptane per pass using a temperature of 350° F. and a pressure of at least 1350 p.s.i.a. so that the gas product contains less than 10% water vapor.

Figure 2:
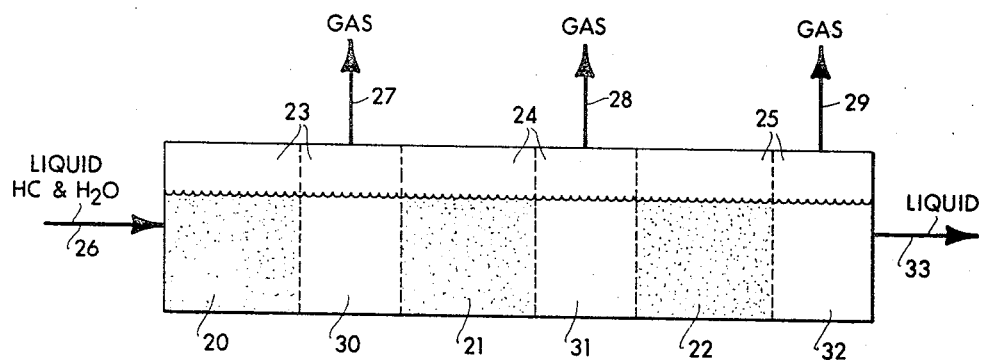
FIG. 2 is a schematic simplified system showing a series of reactors or reaction zones wherein the conversion of liquid hydrocarbons to a hydrogen-rich gas takes place.

In FIG. 2 is shown a reaction vessel 19 containing a plurality of catalyst reaction beds 20, 21 and 22 having gas collection areas 23, 24 and 25 spaced above and between the catalyst beds. The hydrocarbon-water mixture as an emulsion is fed into the first of the catalyst beds 20 from line 26 to flood the catalyst bed and therein become partially converted to gas product which is collected in the gas space 23 to be removed through the outlet line 27. The unconverted liquid mixture is then passed to the next catalyst bed 21 to be further partially converted to gas product which collects in gas space 24 and is removed through outlet pipe 28. Again in bed 22, the emulsion passed thereto is partially converted to form gas collected in space 25 and removed through line 29. Following each bed 20, 21 and 22, the emulsion is passed into the gas disengaging chambers 30, 31 and 32. The movement of the unconverted emulsion may thus be repeated through a sequence of catalyst beds or reaction cites. Gas is removed by line 29 from gas space 25 and residual liquid emulsion by line 33.

Any remaining unconverted hydrocarbon and water in liquid phase can be recycled to the first reaction bed. The product gases evolved or generated in each of the beds can be collected and separated into their components by known methods which may employ fractional liquefaction, distillation, selective adsorption and/or selective absorption.

The gas outlet pipes may include a tube which permits preferential escape of hydrogen from the gas product mixture such as palladium, palladium-silver or porous tetrafluoroethylene tube such tubes being in chambers from which the separated hydrogen can be withdrawn.

In the emulsion reactors shown in FIG. 1 and FIG. 2 a differential reaction is achieved by having the catalyst submerged in the aqueous hydrocarbon oil emulsion and removing the product gas as it is generated so that the product gas does not recontact the catalyst. Thus, a hydrogen-rich gas product may be constantly removed from the reactor with low expenditure of energy for circulation of the liquid emulsion. By keeping the said hydrocarbon and water mainly in the liquid phase, the only thermal requirements of the system are the endothermic heat of reaction with a relatively small amount of heat of vaporization.

The liquid phase reforming is carried out at sufficiently low temperatures to keep the total gas and vapor pressures at a suitable level. As the pressure is increased, more product gas may tend to remain dissolved in the emulsion, but steps may be taken to further degasify the emulsion. Allowing the vapor pressure of the hydrocarbon and of the water to increase defeats the purpose of lowering the thermal requirements. Thus, reasonable liquid reforming reactions are operated at pressures in the range of 1 to 100 atms. using higher pressures for the more volatile hydrocarbons.

If the liquid phase reforming or emulsion reactor is operated in conjunction with a hydrogen fuel cell, heat for the reforming reaction can be supplied by heat transfer of excess heat in the electrochemical system.

PREFERRED EMBODIMENTS

Example 1

*High activity, high nickel-content catalyst.*—A nickel-alumina-lanthanum catalyst with a nickel to aluminum atom ratio of 3:1 was prepared as follows: 320 grams of $Al(NO_3)_3 \cdot 9H_2O$ and 750 grams of $Ni(NO_3)_2 \cdot 6H_2O$ were added to 3 liters of deionized water and the solution brought to 120° F. While stirring, 750 grams $NH_4HCO_3$ were added over an approximate one-hour period while maintaining the temperature at 120° F. After the precipitation was completed, the slurry was stirred an additional hour at 120° F. and then filtered. To the wet catalyst paste was added 93.6 grams of $La(NO_3)_2 \cdot 6H_2O$ dissolved in deionized water and the mixture stirred well. The catalyst was dried overnight at 230° F. and then calcined in air for four hours at 750° F.

The calcined catalyst is activated for use as a reforming catalyst by a reduction or treatment such as the flowing stream of hydrogen at temperatures of 600° to 900° F. for 1 or several hours. In this reduction treatment, nickel oxide interspersed in the alumina is reduced to metallic nickel. Promoting metals, e.g., La, Ba, Sr, Ce, Cs, K, Fe, Y, Cu and mixtures thereof are considered to be present as oxides. These promoting metals may be added to the dried nickel-alumina catalyst before calcination by impregnating with decomposable compounds in aqueous solution such as nitrate salts of the promoting metals.

*Example 2*

*Liquid phase reforming system batch operation.*—To a glass reaction vessel at atmospheric pressure was charged 240 grams of a nickel-alumina-lanthanum catalyst prepared as in Example 1. The catalyst was then reduced by contacting it overnight with a solution containing 200 grams of lithium biphenyl radical anion dissolved in 1000 grams of tetrahydrofuran at room temperature. The radical anion solution was drained from the reactor and 250 cc.'s of a freshly prepared emulsion containing 4 volumes of water per volume of decane, prepared by use of a nitrogen blanketed blender was passed under a hydrostatic pressure above 1 atm. to the reactor. Care was taken to allow a gas separation zone free of catalyst to remain above the emulsion-catalyst mixture so that product gas could escape readily. Product gas was measured by a wet test meter and gas samples were taken in stainless steel bombs for analysis by a mass spectrometer. After an initial line out period, gas flowed under superatmospheric pressure from the reactor at 140° F. starting at a rate of 0.5 liter per hour. Samples of the product gas on a dry basis analyzed as follows:

TABLE

| Sample | Run 1 | Run 2 |
| --- | --- | --- |
| Mole Percent Hydrogen | 58.1 | 66.0 |
| Methane | 6.1 | 2.2 |
| Total $C_2$ | 5.3 | 3.3 |
| Total $C_3$ | | |
| Total $C_4$ | 0.8 | |
| Total $C_5$ | 1.0 | 1.5 |
| Total $C_6$ | 0.1 | |
| Carbon dioxide | 28.6 | 27.0 |

These test runs demonstrated that the system was operative at low temperatures and under atmospheric pressures or above without need of pumping using liquid hydrocarbons.

*Example 3*

*Liquid phase reforming in a multi-bed emulsion flow reactor.*—A tubular reactor was charged with 60 grams of high nickel content nickel-aluminum-strontium catalyst. The catalyst was reduced in flowing $H_2$ at 900° F. for 2 hours. The reduced catalyst was arranged in shallow beds within the tubular reactor, each of the catalyst beds having an upper gas space free of catalyst for gas removal. An emulsion of 1 mole decane per 9 moles of water was prepared and introduced under pressure to the initial catalyst bed in the reactor tube at 150° F. The unreacted emulsion flowing in sequence through the remaining beds of catalyst and the gas product evolved in each of the beds was removed into a space above the beds and from there to outside the reactor tube to be passed to a separator chamber where liquid was separated. Gas from the separator chamber was passed through a wet gas meter. Product gas containing principally $H_2$ and $CO_2$ was removed at a steady rate after the emulsion was flowing through the reactor tube in a manner to flood each of the beds of catalyst of not more than 4 cm. depth.

With a minimum of back mixing of gas product with catalyst, with the temperature of reaction raised to 500° F. to obtain 0 up to 3% conversion of the decane per bed in the differential reactor, the gas product tends to contain up to 76 mole percent $H_2$ and 24 mole percent $CO_2$ on a dry basis, based on the overall reaction:

$$C_{10}H_{22} + 20H_2O \rightarrow 10CO_2 + 31H_2$$

With the hydrocarbon oil feed free of gaseous hydrocarbons, the liquid phase reforming produces a gas product containing typically 65 to 75 mole percent $H_2$, 18 to 29 mole percent $CO_2$, less than 5 mole percent gaseous hydrocarbons which cannot be condensed at atmospheric temperatures, and a negligible amount of CO. Such a gas product can be economically purified to a 95% $H_2$ gas simply by removing $CO_2$.

I claim:

1. In a differential reaction process for producing hydrogen using an active nickel-containing reforming catalyst that promotes reaction of a hydrocarbon oil with water to form $H_2$ and $CO_2$, said catalyst containing 10 to 75 wt. percent nickel interspersed with an oxide of the group consisting of alumina and silica and having a nickel surface area of at least 20 m.$^2$/g., the improvement which comprises:

contacting liquid hydrocarbon oil and water in liquid phase with the catalyst at low reaction temperatures in the range of 110° F. to 500° F. under super-atmospheric pressures to maintain said hydrocarbon oil and liquid in liquid phase while a portion of the hydrocarbon oil is converted to generate hydrogen gas product containing $H_2$ and $CO_2$, and removing said gas product as it is generated to recover hydrogen.

2. The process of claim 1 wherein said catalyst is submerged in an aqueous emulsion of the hydrocarbon oil in water and said gas product is removed as generated from the emulsion to a contiguous gas collection zone free of said catalyst.

3. The process of claim 1 wherein said liquid hydrocarbon oil comprises mainly paraffinic hydrocarbons containing at least 5 carbon atoms per molecule.

4. The process of claim 1 wherein said catalsyt contains 40 to 45 wt. percent nickel interspersed with alumina and 0.5 to 12 wt. percent of a promoter metal selected from the group consisting of La, Ba, Sr, Ce, Cs, K, Fe, Y and Cu and has a nickel surface area of 20 to 30 m.$^2$/g.

References Cited

UNITED STATES PATENTS

| Re. 19,733 | 10/1935 | Hansgirg | 23—213 |
| 3,069,250 | 12/1962 | Weittenhiller et al. | 23—213 XR |
| 3,147,080 | 9/1964 | Jahnig | 23—212 |
| 3,320,182 | 5/1967 | Taylor et al. | 23—212 XR |

FOREIGN PATENTS

| 7,128 | 5/1927 | Australia. |
| 9,017 | 8/1927 | Australia. |

OSCAR R. VERTIZ, *Primary Examiner.*

EDWARD STERN, *Assistant Examiner.*